July 7, 1953  D. A. REGIMBALD  2,644,350
DRILL BUSHING
Filed Jan. 9, 1951
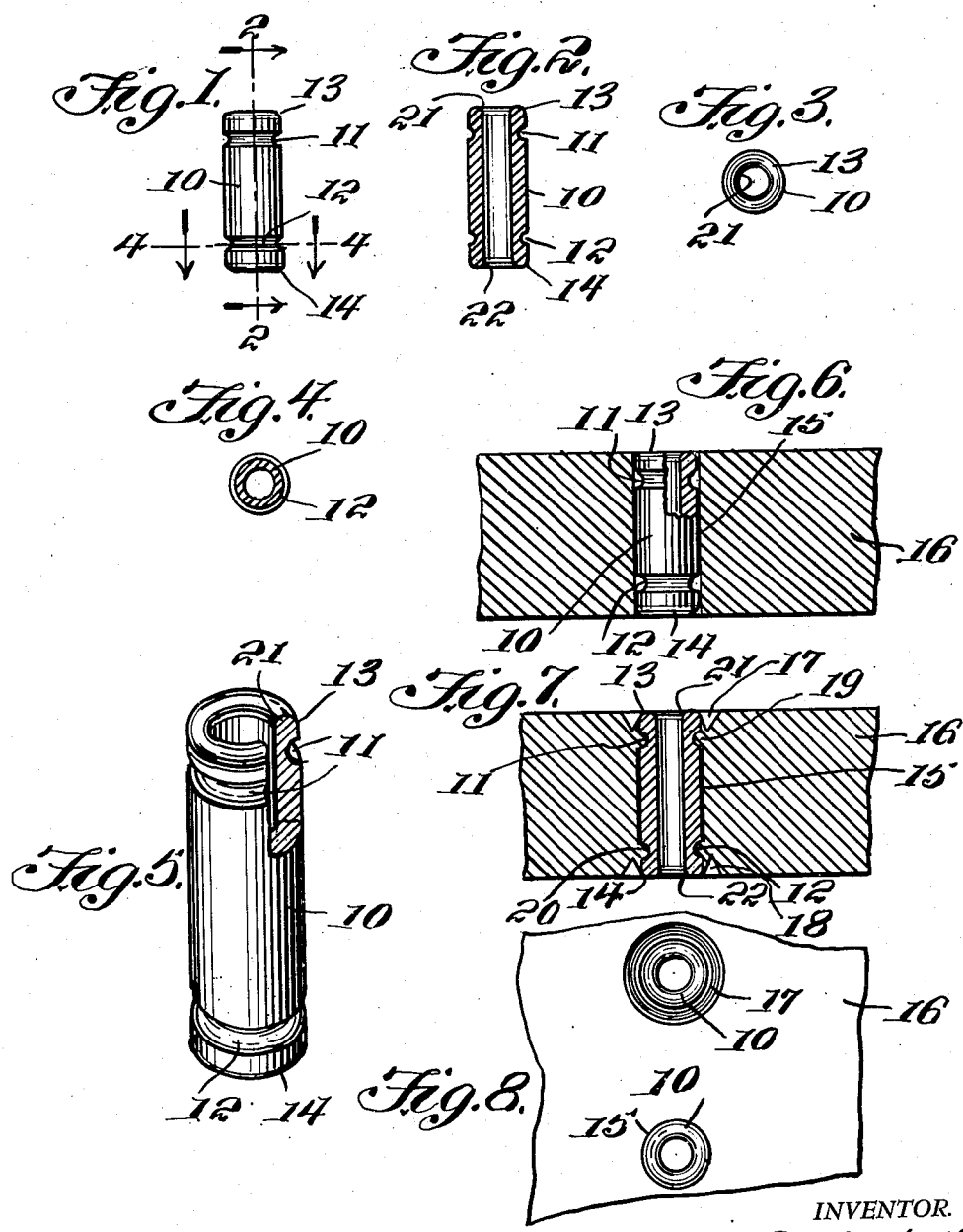
INVENTOR.
Daniel A. Regimbald,
BY Victor J. Evans & Co.
ATTORNEYS Patented July 7, 1953

2,644,350

UNITED STATES PATENT OFFICE 2,644,350

DRILL BUSHING

Daniel A. Regimbald, Detroit, Mich.

Application January 9, 1951, Serial No. 205,151

1 Claim. (Cl. 77—62)

This invention relates to machine tools and particularly jigs wherein drill bushings are used to hold and guide drills for repeat operations, and in particular this invention relates to an improved bushing in which the bushing is provided with annular grooves in the outer surface and spaced from the ends thereof whereby with the bushing forced into an opening in the wall of a jig or the like material from the inside of the jig is forced, by a punch or the like into the grooves for positively securing the bushing in position.

The purpose of this invention is to provide means for mounting drill bushings in jigs and the like without welding, shimming, pinning, or threading and without the use of screws, bolts and the like.

In the conventional method of securing loose drill bushings in jigs by welding, nine operations are required to mount a new bushing in a jig and considerable labor is required in taking the jig down. With this thought in mind this invention contemplates an improved drill bushing for jigs and the like and the method of securing the bushing in a wall or other part of a jig by swedging material of the jig part into annular grooves in the outer surface of the bushing.

The object of this invention is, therefore, to provide means for forming a drill bushing so that the bushing may be rigidly mounted in a jig without welding and without the use of screws, bolts and the like.

Another object of the invention is to provide an improved drill bushing for jigs and the like that may be installed without changing the design or structure of the jig.

A further object of the invention is to provide an improved drill bushing for jigs and the like which is of a simple and economical construction.

With these and other objects and advantages in view the invention embodies a tubular or cylindrical member having annular grooves in the outer surface and spaced from the ends and in which the corners of the outer surface at the ends of the bushing are rounded.

Other features and advantages of the invention will appear from the following description taken in connection with the drawings wherein:

Figure 1 is a view showing a side elevation of the improved bushing.

Figure 2 is a longitudinal section through the bushing taken on line 2—2 of Figure 1.

Figure 3 shows an end view of the bushing.

Figure 4 is a cross section through the bushing taken on line 4—4 of Figure 1 and showing a section through one of the grooves thereof.

Figure 5 is a perspective view illustrating the improved drill bushing and showing part broken away and shown in section.

Figure 6 is a view showing the improved drill bushing positioned in an opening in a piece of material and with part of the bushing broken away and shown in section.

Figure 7 is a similar view showing part of the material of the member in which the bushing is mounted swedged into the annular grooves in the outer surface of the bushing.

Figure 8 is a plan view showing two bushings in a piece of material with one of the bushings swedged into the material.

Referring now to the drawings wherein like reference characters denote corresponding parts the improved drill bushing of this invention includes a cylinder 10 with annular grooves 11 and 12 in the outer surface and spaced from the ends thereof and with the corners 13 and 14 of the ends rounded, as illustrated.

A bushing formed in this manner is threaded in an opening 15 in the wall of a jig or other member as indicated by the numeral 16 and after the bushing is in position, as shown in Figure 6, an annular swedging tool is forced into the surfaces of the material 16, forming grooves 17 and 18, and the material, as indicated by the numerals 19 and 20, is forced into the grooves 11 and 12.

By this means the drill bushing is positively secured in the wall or jig or other parts thereof without welding and without the use of pins or shims and without the necessity of using screws, bolts and the like.

The inner edges 21 and 22 of the ends of the bushing are also arcuate or rounded to facilitate guiding a drill through the bushing.

It will be understood that modifications may be made in the design and arrangement of the parts without departing from the spirit of the invention.

What is claimed is:

In a drill jig bushing mounting, the combination which comprises a cylindrical bushing having a bore and having annular grooves in the outer surface and spaced from the ends thereof, and a body having a substantially cylindrical bore in which the bushing is positioned, said body having annular recesses extended around the ends of said bore and positioned in end surfaces thereof, and the material of said body displaced therefrom in the formation of said recesses being extended into the annular grooves of the bushing for retaining the bushing in position in said body.

DANIEL A. REGIMBALD.

References Cited in the file of this patent

UNITED STATES PATENTS

| Number | Name | Date |
|---|---|---|
| 460,952 | Converse | Oct. 13, 1891 |
| 1,903,776 | Clark et al. | Apr. 18, 1933 |
| 2,083,490 | Boker | June 8, 1937 |
| 2,372,485 | Griffin | Mar. 27, 1945 |